No. 886,239. PATENTED APR. 28, 1908.
W. W. NEIGHBOUR.
TROLLEY WHEEL.
APPLICATION FILED JULY 13, 1907.
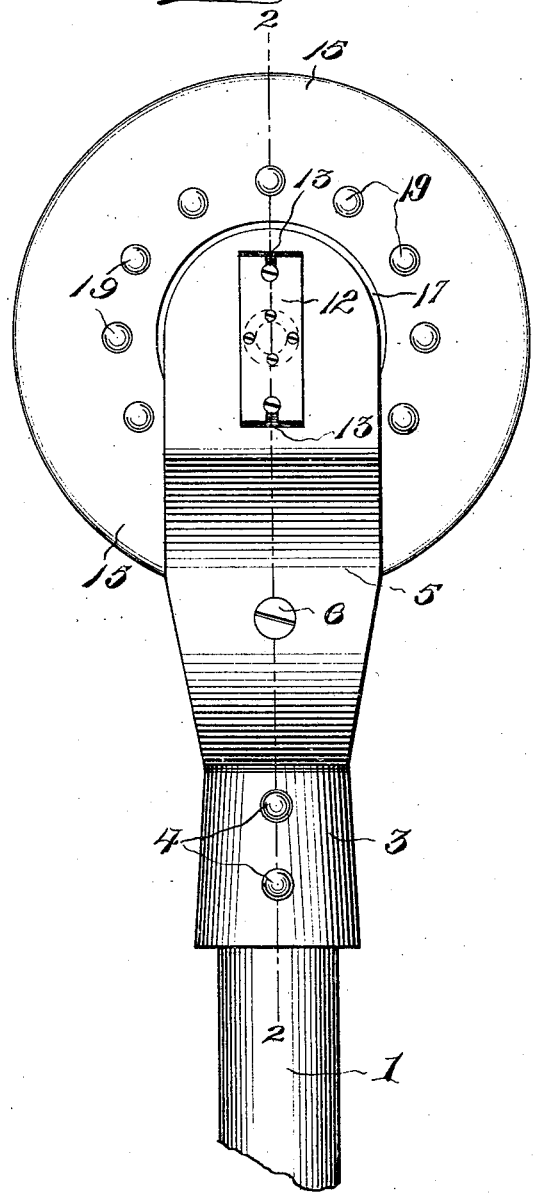
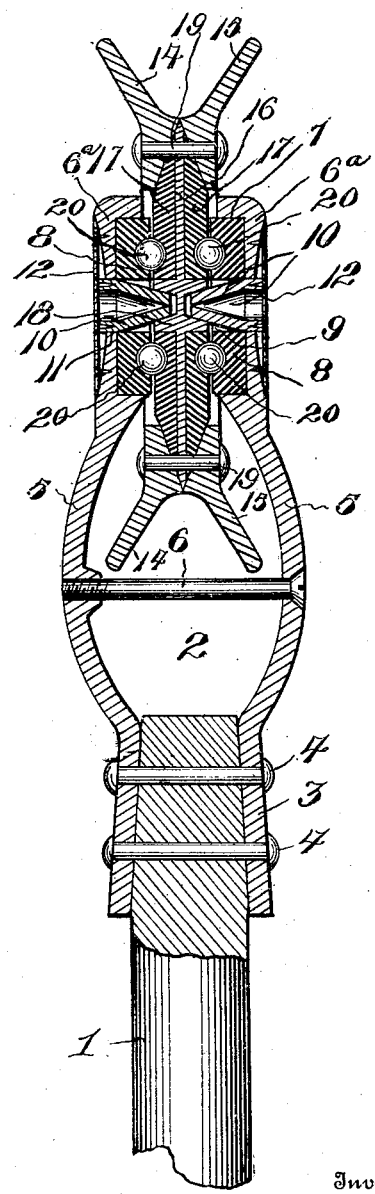
Witnesses
Inventor
William W. Neighbour,
By Victor J. Evans
Attorney

UNITED STATES PATENT OFFICE.

WILLIAM W. NEIGHBOUR, OF DENISON, TEXAS.

TROLLEY-WHEEL.

No. 886,239.　　　　Specification of Letters Patent.　　　Patented April 28, 1908.

Application filed July 13, 1907. Serial No. 383,589.

*To all whom it may concern:*

Be it known that I, WILLIAM W. NEIGHBOUR, a citizen of the United States, residing at Denison, in the county of Grayson and State of Texas, have invented new and useful Improvements in Trolley - Wheels, of which the following is a specification.

This invention relates to improvements in trolley wheels and harps, the object of the invention being to provide a construction by which the ordinary axle, journal boxes and tie bolt may be dispensed with and the wheel mounted in anti-friction bearings so as to have free revoluble movement, and by which the current may be transmitted from the conductor wire through the center of the wheel to the trolley pole without break or division in its passage and also without passing through the bearings proper of the wheel.
A further object of the invention is to provide anti-friction bearings of novel construction which are adapted to be conveniently applied and removed in the operation of mounting the wheel and removing the same for renewal or repairs, and which are effectually insulated from the electric current conductors.

A still further object is to provide a novel construction of means whereby the wheel will be effectually lubricated.

With these and other objects in view, the invention consists of the features of construction, combination and arrangement of parts hereinafter fully described and claimed, reference being had to the accompanying drawing, in which:—

Figure 1 is a side view of a trolley harp and wheel constructed in accordance with my invention. Fig. 2 is a vertical cross section on line 2—2 of Fig. 1.

Referring to the drawing, the numeral 1 designates the trolley pole, upon which is mounted the wheel supporting yoke or harp 2, said harp comprising a socket 3 receiving the upper end of the pole and suitably fastened thereto, as by bolts or rivets 4, and having upwardly extending bowed or curved arms 5 connected and reinforced by a tie bolt 6. The upper ends of the arms 5 terminate in parallel bearing heads 6ª.

The heads 6ª are of cup-form and provided on their inner faces with recesses 7 receiving bearing blocks or disks 8 composed in whole or part of insulating material. These disks are of annular form and are provided with central openings 9 for the passage of spindles 10. The said spindles project inwardly through openings 11 in the heads, and are preferably hollow to form receptacles or chambers for a suitable lubricating substance, and are secured at their outer ends to springs 12, said springs being detachably secured to the outer faces of the heads by screws or other suitable fastenings 13 and operating to force the spindles inwardly. In the form shown, the spindles are of conical shape, their reduced ends extending inwardly beyond the inner faces of the bearing disks 8 for engagement with the hub of the trolley wheel and being open to provide reduced feed passages for the flow or feed of the lubricant to the hub.

The trolley wheel comprises a channeled rim formed of two sections 14 and 15, and a body comprising a central conducting plate 16 and opposite outer disks 17 of insulating material. The outer faces of the disks 17 are beveled for a distance inwardly from their edges, which terminate short of the outer edge of the plate 16. The edge of the plate 16 is beveled upon both sides to a point, the bevel or taper conforming to the bevel or taper of the edges of the disks 17. The disks are apertured to receive sockets 18 projecting laterally from the center of the plate 16, which sockets form a hub and receive the inner ends of the spindles 10, by which the wheel is journaled for rotation on said spindle, and the hub and bearing surfaces thus far mentioned are lubricated therefrom.
The tapered outer edge of the body of the wheel constructed in the manner described fits between the meeting faces of the rim sections 14 and 15, which are beveled to produce a correspondingly formed receiving recess, said rim sections being coupled and united to the body of the wheel by transverse coupling bolts or rivets 19.

The inner faces of the disks 8 and outer faces of the disks 17 are annular grooved to form race-ways for sets of bearing balls 20 by which the wheel is mounted to turn freely with a minimum degree of friction and is prevented from having lateral play or movement. It will be observed that these balls are insulated from the current conducting plate 16, which is in contact with the rim of the wheel and through which the current passes to the hub 18, thence through the spindles 10 and springs 12 to the arms of the yoke, and thence through the trolley pole 1 to the motor circuit of the car. As a result of this construction and arrangement, the bearings are protected from the current and the latter is undivided, but is transmitted or flows without break or interruption through the center of the wheel and thence through the sides of the harp to the trolley pole. In practice, the bearing disks 8 and the disks 17 of the body of the wheel may have their grooves metal-lined to relieve the same from undue wear, or may be constructed in any other suitable manner to provide hardened bearings for the balls to run in contact with.

From the foregoing description, taken in connection with the drawing, it will be seen that my invention provides a trolley wheel and harp wherein the objectionable practice of mounting the wheel upon an axle journaled in boxes is obviated, and provision made for securing free rotary movement of the wheel with a minimum degree of friction, and also for lubricating the wheel in an efficient manner. It will further be seen that the construction is such as to permit of the ready assemblage and disassemblage of the parts, and that the mode of mounting the wheel causes it to at all times run true, thus reducing wear and tear. By the tapered formation of the spindles and their receiving sockets in the hub undue lateral pressure of the wheel on the bearing balls is prevented, and by utilizing the spindles as lubricant receptacles the wheel may be kept supplied with a sufficient amount of lubricant to adapt it to run freely on the spindles.

Having thus described the invention, what I claim as new and desire to secure by Letters Patent is:—

1. A trolley wheel comprising a central metallic disk provided with a hub, disks of insulating material on opposite sides of the metallic disk and perforated to receive the ends of the hub, and a conducting rim secured to the disks and in contact with the central disk.

2. A trolley wheel comprising a central conducting disk provided with a hub, disks of insulating material on opposite sides of the central disk and perforated to receive the ends of the hub, a sectional rim receiving the edges of the disks, and means fastening the rim sections to the disks.

3. In a trolley wheel, the combination of a harp, conducting spindles supported by the arms of the harp, and a trolley wheel having a hub turning on said spindles, and provided with an insulated conductor leading from its rim to said hub.

4. In a trolley wheel, the combination of a harp, conducting bearings upon the arms of the harp, a trolley wheel journaled on said bearings and provided with a conductor leading from its rim to the hub, and ball bearings between the wheel and harp arms, said bearings being insulated from the wheel and arms.

5. In a trolley wheel, the combination of a harp, hollow lubricating spindles upon the arms of the harp, said spindles forming conductors, a wheel journaled on said spindles and having an electrical conductor connected therewith, and ball bearings between the sides of the wheel and harp arms, said bearings being insulated from the spindles and conductor.

In testimony whereof, I affix my signature in presence of two witnesses.

WILLIAM W. NEIGHBOUR.

Witnesses:
 FREDERICK C. HERZINGER,
 JAMES F. ANNESLEY.